United States Patent [19]

Kondo et al.

[11] Patent Number: 5,782,135
[45] Date of Patent: Jul. 21, 1998

[54] BALL SCREW FOR VACUUM APPARATUS

[75] Inventors: Hiromitsu Kondo, Kuwana; Tokumasa Nakamura, Kwana; Hiroshi Yamada, Kuwana; Masahiro Nobutomo, Fukuroi; Michiyoshi Ishimaru, Kuwana, all of Japan

[73] Assignee: NTN Corporation, Osaka, Japan

[21] Appl. No.: 794,487

[22] Filed: Feb. 4, 1997

Related U.S. Application Data

[63] Continuation of Ser. No. 493,748, Jun. 22, 1995, abandoned.

[30] Foreign Application Priority Data

Jun. 24, 1994 [JP] Japan ................................ 6-142702

[51] Int. Cl.$^6$ ............................ F16H 25/22; F16C 33/66
[52] U.S. Cl. ..................... 74/459; 74/424.8 R; 384/492
[58] Field of Search ............... 74/89.15, 424.8 R, 74/459; 384/492, DIG. 907.1, DIG. 908

[56] References Cited

U.S. PATENT DOCUMENTS

| | | | |
|---|---|---|---|
| 2,869,377 | 1/1959 | Pieterse | 74/459 |
| 3,132,719 | 5/1964 | Cole | 74/459 |
| 5,150,398 | 9/1992 | Nishioka et al. | 384/492 |
| 5,163,757 | 11/1992 | Graham | 384/492 |
| 5,168,767 | 12/1992 | Morita | 74/459 |
| 5,207,513 | 5/1993 | Kondo et al. | 384/492 |

*Primary Examiner*—Charles A. Marmor
*Assistant Examiner*—David M. Fenstermacher
*Attorney, Agent, or Firm*—Nikaido, Marmelstein, Murray & Oram LLP

[57] ABSTRACT

A ball screw for a vacuum apparatus which includes a screw shaft having a spiral inner raceway formed on an outer peripheral surface thereof, a ball nut having a spiral outer raceway formed on an inner peripheral surface thereof, a plurality of balls disposed in a spiral space defined between the inner raceway and the outer raceway, and circulating members connecting ends of the spiral space to each other to define a continuous ball circulating passage. The plurality of balls are first balls formed of high polymer material containing polytetrafluoroethylene as a main component and second balls formed of either a metallic material or a ceramic material. The first balls circulate through the circulating passage together with the second balls. The second balls have lubricating films of crystalline polytetrafluoroethylene formed on the surface thereof.

4 Claims, 3 Drawing Sheets

BALL SCREW FOR VACUUM APPARATUS

This application is a continuation of application Ser. No. 08/493,748 filed Jun. 22, 1995, now abandoned.

BACKGROUND OF THE INVENTION

The present invention relates to a ball screw used in etching units included in semiconductor producing facilities, space concerned machines and instruments, and the like.

A ball screw comprises a plurality of balls disposed in a spiral ball circulating passage formed between a screw shaft and a ball nut, the transmission of power being effected between the screw shaft and the ball nut through said balls. Since the balls are rolling while slipping under a resultant of rotational and axial forces, both rolling and sliding frictions simultaneously take place in the area of contact between the balls and the ball circulating passage. When the balls collide with each other, their respective directions of rotation are reversed, so that the relative slip velocity between the balls becomes twice the corresponding value for a single ball to make the great frictional force occur. Therefore, in ball screws, lubrication is of primary importance, and the quality of lubrication exerts great influence on the durability thereof.

On the other hand, in the etching process and CVD (chemical vapor deposition) coating process for semiconductors, since reactive gases, such as silane type, fluorine type and chloride type, are used, the ball screw incorporated in the processing unit occasionally come into contact with such corrosive reactive gases. For example, in the etching unit, ball screws are rarely used in the treating chamber; mainly they are used in the wafer cassette chamber, in which there is no chance for direct contact with the reactive gases. However, during transfer of wafers between chambers, the reactive gases sometimes flow into the cassette chamber to contact the ball screws. The ball screw which is used in such corrosive environment requires a corrosion resistance as well.

Further, in semiconductor producting facilities, vacuum apparatuses are used mainly on an in-line basis, and a transfer device for transfer of work between vacuum apparatuses moves between atmospheric and vacuum environments. Therefore, a ball screw installed in such transfer device also requires characteristics which enable it to ensure operation both in the air and in a vacuum.

Further, a ball screw used in space-associated machines and instruments requires very high reliability.

In this connection, for lubrication for ball screws used in a vacuum, use is often made of solid lubricants including laminar materials such as molybdenum disulfide, soft metals such as gold, silver and lead, and high molecular materials such as polytetrafluoroethylene (PTFE) and polyimide, such lubricants being used in the form of coating.

Of these lubricants, the laminar materials and soft metals are easily attacked by reactive gases and hence are not suitable for use in the aforesaid corrosive atmosphere. Further, since silver rapidly wears or deteriorates in the air, while molybdenum disulfide rapidly deteriorates as it absorbs moisture in the air, they cannot be used both in the air and in a vacuum. In contrast, PTFE, which is a chemically stable substance, is less liable to be attacked by reactive gases and is superior in durability for use both in a vacuum and in the air.

However, when the lubricant film of PTFE repeats peeling and deposition, the film thickness varies, so that reactive gases may penetrate into the thin film portion to attack the base material or the decrease in the film thickness may degrade the lubricating function. Therefore, simply applying a PTFE film to the surface of a ball screw where rolling or sliding friction takes place is sometimes found insufficient to secure good durability or corrosion resistance.

SUMMARY OF THE INVENTION

Accordingly, an object of the present invention is to provide a ball screw having good durability and capable of ensuring use in a corrosive atmosphere, in the air and in a vacuum.

A ball screw for a vacuum apparatus according to the present invention comprises a screw shaft having a spiral inner raceway formed on the outer peripheral surface thereof, a ball nut having a spiral outer raceway formed on the inner peripheral surface thereof, a plurality of balls disposed in a spiral space defined between the inner and outer receways, circulating member defining a continuous ball circulating passage connected to the spiral space, wherein some of the plurality of balls are non-loaded balls which do not bear load, the others are loaded balls which bear load, the non-loaded balls being made of a PTFE type high molecular material having self lubricating property, at least either the surfaces of loaded balls or the surfaces of the members forming the ball circulating passage, particularly the surfaces of the loaded balls are formed with lubricating films of crystalline PTFE.

Further, in the above arrangement, the loaded balls are made of ceramic material.

Lubricating films of crystalline PTFE exert a good lubricating function in the area of contact between the loaded balls and the ball circulating passage while protecting the surface of the base material from reactive gases. Further, the lubricating films of PTFE exhibit good durability in the air and in a vacuum. Furthermore, even If the lubricating films are partly removed through wear, deposition of lubricating debris of PTFE supplied from the non-loaded balls formed of a PTFE type high molecular material can be expected; thus, the good lubrication and corrosion resistance are maintained for a long time.

Making the loaded balls of ceramic material further improves the corrosion resistance. Further, even if the lubricating films are partly removed, the ceramic-to-metal contact between the loaded balls and screw shaft and ball nut produces no adhesion phenomenon and hence there is little danger of rotational incapability.

Therefore, according to the present invention, there is provided a ball screw which has good durability and which can stand use in a corrosive atmosphere and in the air and in a vacuum.

DESCRIPTION OF THE PREFERRED EMBODIMENTS

Embodiments of the present invention will now be described with reference to the accompanying drawings.

Figure 1A:
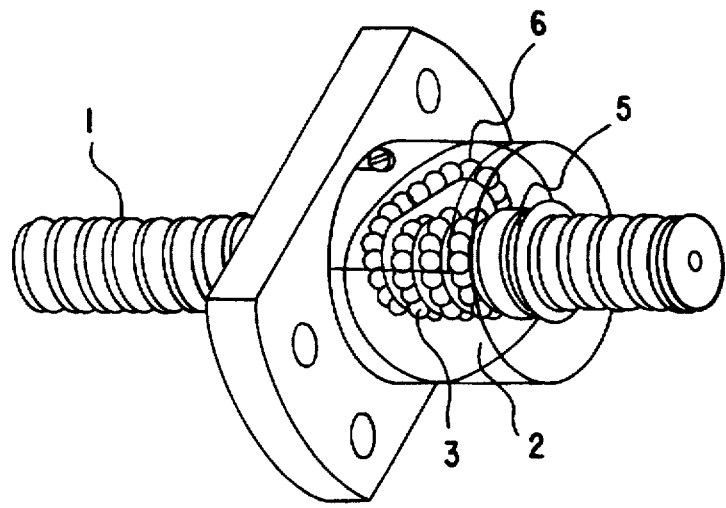
FIG. 1 is a perspective view (FIG. a) and a sectional view (FIG. b), showing an embodiment of the present invention.
Figure 1B:
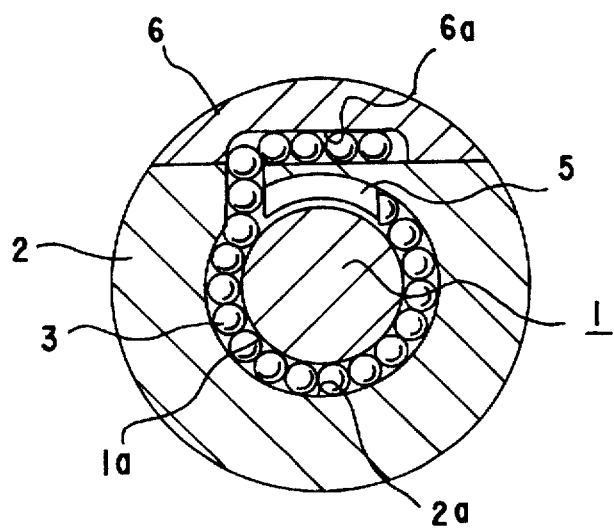

An embodiment shown in FIG. 1 shows the present invention applied to a guide plate type ball screw. This ball screw comprises a screw shaft 1 having a spiral inner raceway 1a formed on the outer peripheral surface thereof, a ball nut 2 having a spiral outer raceway 2a formed on the inner peripheral surface thereof, a plurality of balls 3 disposed in a spiral space defined between said inner and outer raceways 1a and 2a, and a deflector 5 and a guide plate 6 which serve as members for forming a continuous ball circulating passage connected to the spiral space. The balls 3 rolling between the screw shaft 1 and the ball nut 2 circulate as they are scooped by the deflector 5 installed on the inner periphery of the ball nut 2 to travel in a circulating groove 6a formed in the guide plate 6 attached to the ball nut 6, the balls 3 returning to the space between the screw shaft 1 and the ball nut 2.

Figure 2:
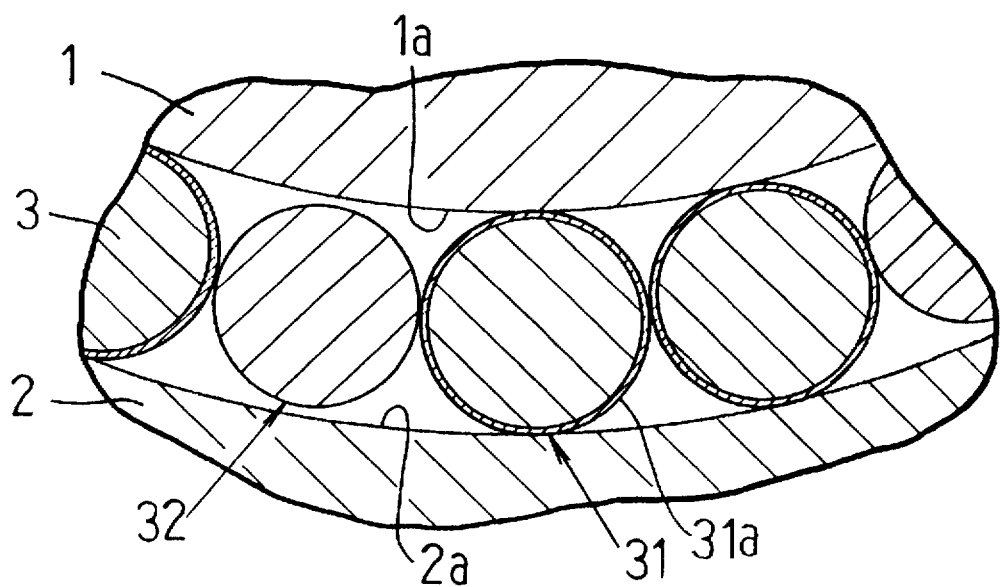
FIG. 2 is an enlarged sectional view of a ball peripheral region.

As shown enlarged in FIG. 2, some of the plurality of balls 3, e.g., two thirds are loaded balls 31 which bear screw load and the rest, one third, are non-loaded balls 32, the loaded and non-loaded balls 31 and 32 being disposed in an alternate pattern of 2:1. The loaded balls 31 are made of metal, such as stainless steel, while the non-loaded balls 32 are made of a PTFE type high molecular material (such as one with PTFE added to a polyimide base). The surfaces of the loaded balls 31 are formed with lubricating films 31a of crystalline PTFE. The term "lubricating films of crystalline PTFE" used herein refers to lubricating films not having the crystalline structure (molecular structure) of PTFE divided unlike the so-called spattered films. Such lubricating films being formed, for example, by spraying an object with a treating solution of PTFE powder in an organic solvent or by immersing the object in the treating solution.

The lubricating films 31a described above develop the excellent lubricating function inherent to PTFE, enhancing the durability of the ball screw. Further, even if the lubricating films 31a are partly removed through wear, PTFE debris-powder (which is produced as the surfaces of the non-loaded balls 32 are scraped by their contact with the surfaces of the members forming the ball circulating passage, i.e., the inner raceway 1a of the screw shaft 1, the outer surface 2a of the ball nut 2, the inner peripheral surface of the deflector 5, the surface of the circulating groove 6a of the guide plate 6 and with neighbouring loaded balls), will deposit on the lubricating films to compensate for their loss; thus, satisfactory lubrication is maintained for a long time.

When this ball screw is used in a corrosive atmosphere, lubricating films of crystalline PTFE may be applied not only to the loaded balls 31 but also to the inner raceway 1a of the screw shaft 1 and the outer raceway 2a of the ball nut 2 and, if necessary, further to the inner peripheral surface of the deflector 5 and the surfaces of the circulating groove 6a of the guide plate 6. These lubricating films, besides contributing to lubrication, protect the surface of the ball circulating passage from the corrosive atmosphere, thus providing good corrosion resistance. Furthermore, the supply of lubricating debris of PTFE from the non-loaded balls 32 maintains the good corrosion resistance for a long time. This results in a radical reduction in cost as compared with the case of forming these members of a corrosion resisting material.

In this embodiment, the non-loaded balls 32 are slightly smaller in diameter than the loaded balls 31. This is intended to ensure that the amount of supply of lubricating debris of PTFE is optimum. That is, the lubricating debris of PTFE supplied from the non-loaded balls 32 has only to be in an amount necessary for good lubrication, while an excessive amount of lubricating debris would lead to generating dust.

This arrangement reduces friction force between the non-loaded balls 32 and the surface of the ball circulating passage to prevent production of an excessive amount of lubricating debris, thereby minimizing the amount of dust expelled from the ball screw, thus securing a low dust generating characteristic. This is advantageous particularly when the ball screw is used in a highly clean environment as in semiconductor producing facilities. Further, this also reduces torque.

Figure 3:
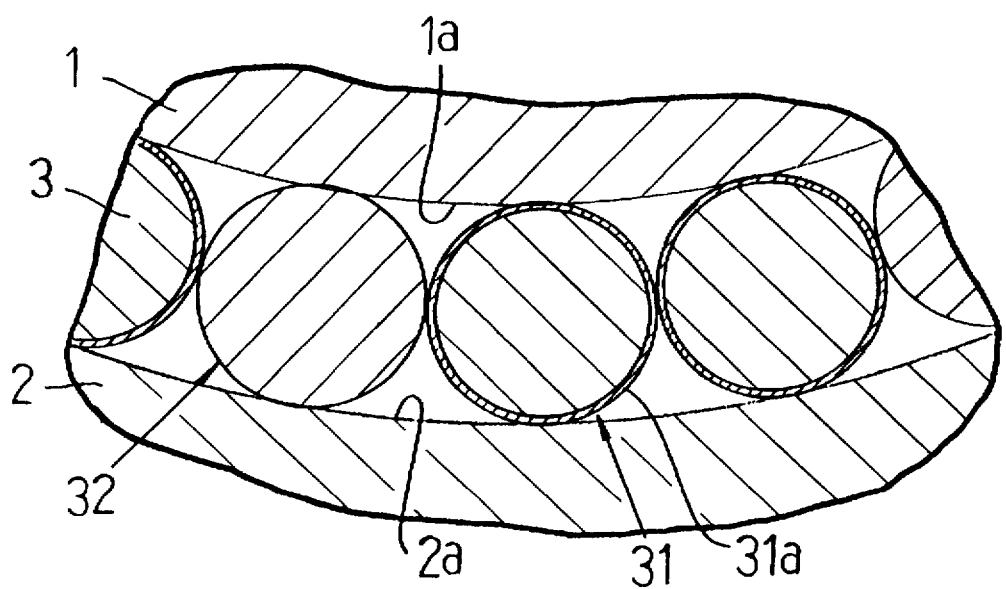
FIG. 3 is an enlarged sectional view of a ball peripheral region In another embodiment of the invention.

In the case where priority is given to lubrication rather than to low dust generating characteristic, it is preferable, as shown in FIG. 3, to make the diameter of the non-loaded balls 32 equal to or slightly greater than that of the loaded balls 31. Increased force of friction between the non-loaded balls 32 and the surface of the ball circulating passage increases the amount of PTFE lubricating debris supplied from the non-loaded balls 32, thus more effectively compensating for the loss of the lubricating films.

Figure 4:
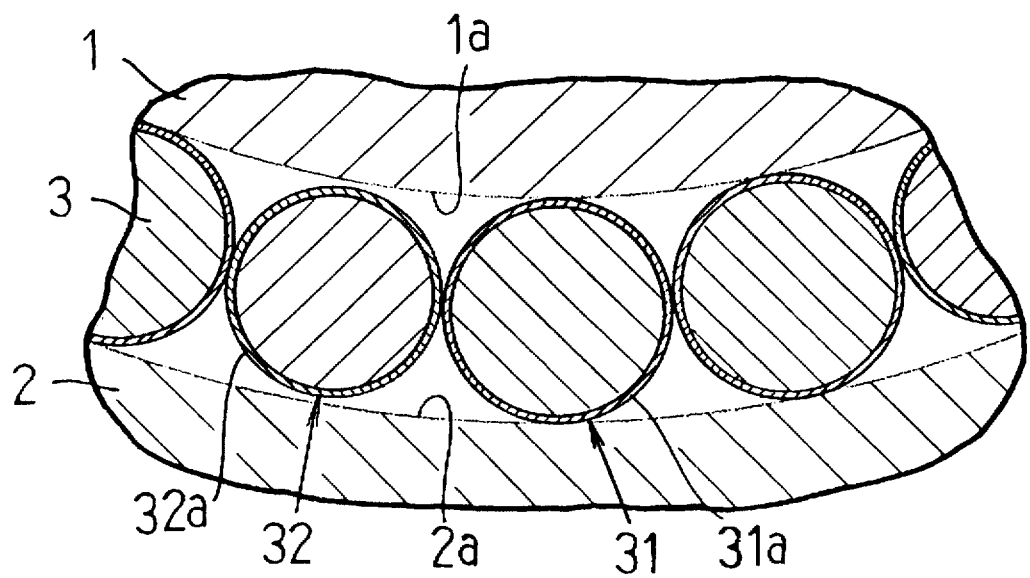
FIG. 4 is an enlarged sectional view of a ball peripheral region in another embodiment of the invention.

In an embodiment shown in FIG. 4, the surfaces of the non-loaded balls 32 are formed with lubricating films 32a of crystalline PTFE. The formation of lubricating films 32a of PTFE in advance on the surfaces of the non-loaded balls 32 ensures smoother occurrence of production and deposition of PTFE lubricating debris, a feature which is advantageous for the initial period of operation.

Figure 5:
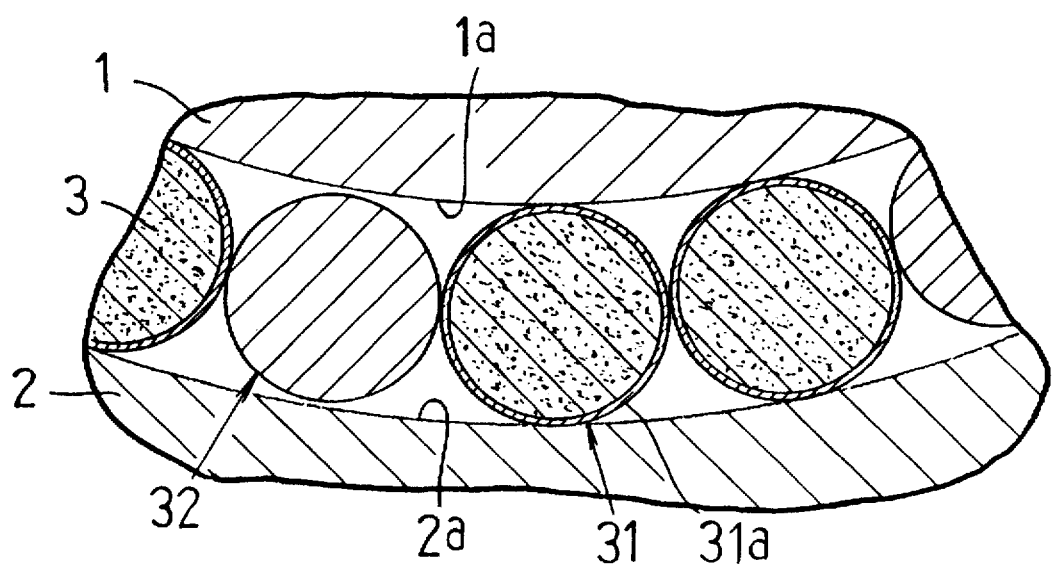
FIG. 5 is an enlarged sectional view of a ball peripheral region In another embodiment of the invention.

In an embodiment shown in FIG. 5, the loaded balls 31 are made of ceramic material. Corrosion resistance is further improved. Further, even if direct contact between the loaded balls 31 and the screw shaft 1 and the ball nut 2 due to the removal of lubricating films 31a and the decreased amount of the lubricating debris, the ceramic-to-metal contact precludes the danger of rotation incapability due to adhesion, thus further improving the reliability.

In addition, the ratio between the loaded balls 31 and the non-loaded balls 32 is desirably 2:1 or thereabouts, but it is not limited thereto; it may be suitably determined by taking conditions for use, etc., into account. Above embodiments refer to the case where the present invention is applied to a guide plate type ball screw; however, it may be likewise applied to return tube type and circulating element type ball screws, producing the same functions and effects.

What is claimed is:

1. A ball screw for a vacuum apparatus comprising:

a screw shaft having a spiral inner raceway formed on an outer peripheral surface thereof;

a ball nut having a spiral outer raceway formed on an inner peripheral surface thereof;

a plurality of balls disposed in a spiral space defined between said inner raceway and said outer raceway;

circulating members connecting ends of said spiral space to each other to define a continuous ball circulating passage, wherein said plurality of balls comprises first balls formed of high polymer material containing polytetrafluoroethylene as a main component and second balls formed of a metallic material, said first balls circulating through said circulating passage together with said second balls, said second balls having lubricating films of crystalline polytetrafluoroethylene formed on surface thereof.

2. A ball screw for a vacuum apparatus as set forth in claim 1, wherein said first balls have lubricating films of crystalline polytetrafluoroethylene formed on surfaces thereof.

3. A ball screw for a vacuum apparatus comprising:

a screw shaft having a spiral inner raceway formed on an outer peripheral surface thereof;

a ball nut having a spiral outer raceway formed on an inner peripheral surface thereof;

a plurality of balls disposed in a spiral space defined between said inner raceway and said outer raceway;

circulating members connecting ends of said spiral space to each other to define a continuous ball circulating passage, wherein said plurality of balls comprises first balls formed of high polymer material containing polytetrafluoroethylene as a main component and second balls formed of a ceramic material, said first balls circulating through said circulating passage together with said second balls, said second balls having lubricating films of crystalline polytetrafluoroethylene formed on surface thereof.

4. A ball screw for a vacuum apparatus as set forth in claim 3, wherein said first balls having lubricating films of crystalline polytetrafluoroethylene formed on surfaces thereof.

* * * * *